(12) United States Patent
Massoulie et al.

(10) Patent No.: US 8,995,279 B2
(45) Date of Patent: Mar. 31, 2015

(54) DISTRIBUTED FLOW MECHANISM FOR PEER-TO-PEER STREAMING

(75) Inventors: Laurent Massoulie, Vaucresson (FR); Dan-Cristian Tomozei, Lausanne (CH)

(73) Assignee: Thomson Licensing, Issy-les-Moulineaux (FR)

( * ) Notice: Subject to any disclaimer, the term of this patent is extended or adjusted under 35 U.S.C. 154(b) by 139 days.

(21) Appl. No.: 13/392,634

(22) PCT Filed: Sep. 13, 2010

(86) PCT No.: PCT/EP2010/063402
§ 371 (c)(1),
(2), (4) Date: Feb. 27, 2012

(87) PCT Pub. No.: WO2011/029936
PCT Pub. Date: Mar. 17, 2011

(65) Prior Publication Data
US 2012/0155275 A1 Jun. 21, 2012

(30) Foreign Application Priority Data
Sep. 14, 2009 (EP) .................... 09305841

(51) Int. Cl.
H04L 12/26 (2006.01)
H04L 12/801 (2013.01)
H04L 12/715 (2013.01)
H04L 12/825 (2013.01)
H04L 12/835 (2013.01)
H04L 29/08 (2006.01)

(52) U.S. Cl.
CPC ........... *H04L 47/10* (2013.01); *H04L 45/64* (2013.01); *H04L 47/12* (2013.01); *H04L 47/17* (2013.01); *H04L 47/25* (2013.01); *H04L 47/263* (2013.01); *H04L 47/30* (2013.01); *Y02B 60/31* (2013.01); *H04L 67/104* (2013.01); *H04L 67/1085* (2013.01)
USPC .......................................... 370/238; 370/252

(58) Field of Classification Search
None
See application file for complete search history.

(56) References Cited

U.S. PATENT DOCUMENTS 6,088,333 A 7/2000 Yang et al.
7,002,917 B1 2/2006 Saleh
(Continued)

FOREIGN PATENT DOCUMENTS

CN 101150491 3/2008
CN 101267450 9/2008
(Continued)

OTHER PUBLICATIONS

Wu et al., "Dynamic Bandwidth Auctions in Multioverlay P2P Streaming with Network Coding," IEEE Transactions on Parallel and Distributed Systems, Los Alamitos, CA, US, vol. 19, No. 6, Jun. 1, 2008, pp. 806-820. 1111.
(Continued)

*Primary Examiner* — Chirag Shah
*Assistant Examiner* — Rina Pancholi
(74) *Attorney, Agent, or Firm* — Myers Wolin LLC

(57) ABSTRACT

The invention concerns a method for flow control in a peer-to-peer live streaming communication network comprising a plurality of nodes characterized in that the rate at which a node sends information to another node increases proportionally to the quantity of information present at node which has not yet reached node and decreases proportionally to a value attached to the link connecting node to node.

21 Claims, 2 Drawing Sheets

(56) References Cited

U.S. PATENT DOCUMENTS

| | | | |
|---|---|---|---|
| 7,924,796 | B2 | 4/2011 | Vu Duong et al. |
| 2002/0194108 | A1 | 12/2002 | Kitze |
| 2004/0093440 | A1* | 5/2004 | Lakaniemi et al. .............. 710/29 |
| 2004/0148423 | A1* | 7/2004 | Key et al. ....................... 709/235 |
| 2006/0146716 | A1 | 7/2006 | Lun et al. |
| 2009/0116393 | A1 | 5/2009 | Hughes et al. |
| 2009/0164615 | A1* | 6/2009 | Akkanen ........................ 709/223 |
| 2009/0198829 | A1 | 8/2009 | Sengupta et al. |
| 2010/0260189 | A1* | 10/2010 | Ansari et al. .................. 370/400 |

FOREIGN PATENT DOCUMENTS

| | | |
|---|---|---|
| EP | 0999717 | 6/2000 |
| EP | 1441288 | 7/2004 |
| WO | WO0250655 | 6/2002 |
| WO | WO2004111775 | 12/2004 |
| WO | WO2007099263 | 9/2007 |

OTHER PUBLICATIONS

Picconi et al., "ISP-friend or foe? Making P2P live streaming ISP-aware," Internet Citation:http://www.thlab.net/(picconi/CR-PRL-2008-11-0001.pdf, Nov. 27, 2008, 4 pages.

Tomozei et al ., "Flow Control for Cost-Efficient Peer-to-Peer Streaming," Internet Citation: http://www.thlab.net/(dantom/pub/nc-rate.pdf, Dec. 21, 2009, 12 pages.

Search Report Dated Oct. 11, 2010.

Zhang et al., "Optimizing the Throughput of Data-Driven Peer-to-Peer Streaming", IEEE Trans. on Parallel and Distributed Systems, vol. 20, No. 1, pp. 97-110, Jan. 1, 2009.

Biskupski et al., "Improving Throughput and Node Proximity of P2P Live Video Streaming through Overlay Adaptation", 9th IEEE International Symposium on Multimedia, Taichung, Taiwan, Dec. 10, 2007, pp. 1-9.

Gurses et al., "Maximum Utility Peer Selection for P2P Streaming in Wireless Ad Hoc Networks", IEEE Communications Society, IEEE "GLOBECOM" 2008 Proceedings, 2008.

Marina, "Game Theoretic Analysis of a Cooperative Communication System", 2008 European Wireless Conference, Prague, Czech Republic, Jun. 22-25, 2008, 6 pages.

Bhadra et al.: "Min-Cost Selfish Multicast With Network Coding"; IEEE Transactions on Information Theory, vol. 52, No. 11, Nov. 2006.

Chen et al: "Utility Maximization in Peer-to-Peer Systems", In Segmetrics '08, Jun. 2-6, 2008: Proceedings of the 2008 ADM Sigmetrics international conference on Measurement and modeling of computer systems, pp. 169-180, New York, NY, USA, 2008, ACM.

Lun et al.: "Minimum-Cost Muiticast Over Coded Packet Networks"; IEEE Transactions on Information Theory, vol. 52, No. 6 , Jun. 2006.

Yeung et al: "Network Coding Theory", Part I: Single Source; Foundations and Trends in Communications and Information Theory vol. 2, No. 4 (2005) 241-329; copyright 2006 R.W. Yeung, S.-Y.R. Li, N. Cai, and Z. Zhang; DOI: 10.1564/01000000071.

\* cited by examiner

DISTRIBUTED FLOW MECHANISM FOR PEER-TO-PEER STREAMING

This application claims the benefit, under 35 U.S.C. §365 of International Application PCT/EP2010/063402, filed Sep. 13, 2010, which was published in accordance with PCT Article 21(2) on Mar. 17, 2011 in English and which claims the benefit of European patent application No. 09305841.0, filed Sep. 14, 2009.

FIELD OF THE INVENTION

The present invention pertains to the field of communication networks.

The present invention more particularly relates to a method for flow control in a peer-to-peer live streaming communication network.

BACKGROUND OF THE INVENTION

Consider a peer-to-peer network with a distinguished node called the source. The source wants to send a stream of bytes to a set of nodes in the peer-to-peer network called the receivers at a fixed rate (i.e. each receiver needs to receive data at the specified rate). The remaining nodes in the peer-to-peer network are called helpers and their role is to relay information. They do not have any rate requirements.

In the peer-to-peer network, each node has a fixed set of outgoing links towards neighbouring nodes over which it sends out data. We call these links overlay links. An overlay link from a node i to its neighbour node j uses several underlay links. In a real setting such an overlay link can be assimilated with a UDP flow from host i to host j in an IP network, while an underlay link can be assimilated with a physical link connecting two IP routers.

If node i sends data to node j on the overlay link (i,j) at a rate c then all the underlay links used by link (i,j) need to support rate c in addition to any other traffic they might be transmitting. Underlay links can be shared among overlay links. Thus, if an underlay link is being used simultaneously by two overlay links which transmit data at rates $c_1$ and $c_2$ respectively, then the underlay link will be used to send data from both overlay links at rate $c_1+c_2$.

Underlay links have a maximum rate at which they can be used. We introduce the natural concept of feasible rate allocation: a set of rates for the overlay links supported by the underlay links (i.e. all underlay links are used at rates lower than the maximum rate which they can sustain).

The congestion control problem can be formulated as a cost minimization problem. We can assign a real cost to each rate allocation. This cost characterizes the level of congestion in the network for that specific rate allocation. We obtain a global cost function defined on the set of all possible rate allocations. Equivalently, the global cost can be represented as the set of marginal overlay link costs (or overlay link prices). Among all feasible rate allocations such that all of the receivers' rate requirements are satisfied, consider a rate allocation achieving the minimum global cost. We call such a rate allocation a globally optimal allocation for the chosen global cost function.

Example of Cost Function Capturing Congestion and ISP Requirements:

A specific set of link prices can be defined as follows: For a particular overlay link e from node i to node j, we set its price to have the following two additive components:

the first one proportional to the observed packet Round Trip Time (RTT) from node i to node j—the congestion term, the second one a constant defined by the Internet Service Provider (ISP) (e.g. the sum of the weights of the underlay links used by the overlay link e)—the ISP term.

The price functions described above have the following properties: the congestion term of the price is inversely proportional to the spare capacity of the overlay link, while the ISP term can be set by the ISP to specific values chosen to avoid intense usage of specific underlay links in the underlying physical topology.

Then any mechanism which guarantees convergence to overlay link rates forming a globally optimal allocation for the cost function defined above performs ISP-friendly congestion control for peer-to-peer live streaming systems.

Prior art knows, through the publication "*Minimum cost multicast over coded packet networks*" (Desmond S. Lun, Niranjan Ratnakar, Muriel Medard, Ralf Koetter, David R. Karger, Tracey Ho, Ebad Ahmed, and Fang Zhao. IEEE/ACM Trans. Netw., 14 (SI):2608-2623, 2006), a message passing scheme which computes a globally optimal allocation. The scalability of this approach is limited due to the fact that messages relative to each receiver need to be passed throughout the network. Thus the number of state variables to be maintained at each node scales linearly with the number of receivers.

Prior art also knows, through the publication "*Min-cost selfish multicast with network coding*" (S. Bhadra, S. Shakkottai, and P. Gupta. Information Theory, IEEE Transactions on, 52 (11):5077-5087, 2006), a so-called UESSM selfish routing algorithm. It is shown that UESSM converges to the min-cost flow allocation for a particular type of cost function. This approach has the same scalability limitations as the above-cited publication by Lun et al.

Consider a peer-to-peer network as defined previously which does not contain any helper nodes. Thus, the source wishes to convey a stream of bytes to all the other nodes in the network at a fixed rate. Previously described solutions in the publications by Lun et al. and Bhadra et al. also apply to this case, but they maintain the same scalability issues.

In "*Utility maximization in peer-to-peer systems*" (Minghua Chen, Miroslav Ponec, Sudipta Sengupta, Jin Li, and Philip A. Chou. In SIGMETRICS '08: Proceedings of the 2008 ACM SIGMETRICS international conference on Measurement and modeling of computer systems, pages 169-180, New-York, N.Y., USA, 2008. ACM), the authors wish to maximize a utility function. The authors present a solution involving packing a polynomial number of depth-1 and -2 Steiner trees for multisource multicast. The scalability of their approach is again limited as it requires all peers to maintain data exchanges with all other peers.

SUMMARY OF THE INVENTION

The present invention aims at solving the above-mentioned drawbacks of the prior art solutions.

The present invention proposes a fully distributed scalable flow control mechanism for live streaming broadcast in a peer-to-peer network.

The technical problem the present invention seeks to solve is the following: find a fully distributed scalable scheme for flow control that converges to the rate allocation of minimum cost among all rate allocations which satisfy the rate requirements.

The scheme needs to be distributed in the sense that the rate adaptation rule for a specific overlay link should only use information locally available at the nodes adjacent to the link. The scalability constraint imposes that nodes maintain a small (typically constant) number of state variables per streaming session.

In the context of the present invention, all nodes are assumed to have up-to-date knowledge of the collection of packets present at their one-hop neighbours (this is not a strong assumption, since such knowledge can be obtained by the use of local control messages). The inventors have defined the usefulness of a node i to a node j as the quantity of information present at node i which has not yet reached node j (e.g., in the case of store-and-forward networks, the packets generated at the source that node i has already received and which are not present at node j).

The present invention defines a rate adaptation rule for each of the overlay links in the peer-to-peer network. For an overlay link e from node i to node j, the rate $c_{ij}$ at which this link is used is decided
  by i in a push-based network (i.e. in which nodes send information to neighbours without specific requests issued to them),
  by j in a pull-based network (i.e. in which nodes send specific requests for information to neighbours).

Specifically, the solution according to the present invention imposes the following rule on all directional links e from node i to node j:

The rate at which node i sends information to node j increases proportionally to the usefulness of node i to node j and decreases proportionally to the price of the link connecting node i to node j The inventors have shown that for coded packet networks (i.e. using Random Linear Network Coding) the solution according to the present invention does not deviate from the global optimum. For both coded packet networks and classic packet networks (i.e. store-and-forward networks), numerical simulations show that the solution according to the present invention is stable.

The present invention is defined, in its broader sense, as a method for flow control in a peer-to-peer live streaming communication network comprising a plurality of nodes (i, j, ..., N), characterized in that the rate at which a node (i) sends information to another node (j) increases proportionally to the quantity of information present at node (i) which has not yet reached node (j) and decreases proportionally to a value (V) attached to the link connecting node (i) to node (j).

According to an embodiment, said value (V) is proportional to the observed packet Round Trip Time (RTT) from node (i) to node (j).

According to another embodiment, said value (V) is a constant defined by an operator of said communication network (called Internet Service Provider or ISP).

According to another embodiment, said value (V) is related to the packet loss rate on said link connecting node (i) to node (j).

According to another embodiment, said value (V) is linked to ECN marks as defined by the IETF ECN standard.

According to a particular embodiment, said value (V) is computed as a combination of:
  observed packet Round Trip Time (RTT) from node (i) to node (j);
  a constant defined by an operator of said communication network (called Internet Service Provider or ISP);
  the packet loss rate on said link connecting node (i) to node (j); and
  ECN marks as defined by the IETF ECN standard According to an embodiment, said rate is decided by node (i).

According to another embodiment, said rate is decided by node (j).

According to an embodiment, the quantity of information present at node (i) which has not yet reached node (j) is the collection of packets present at node (i) which has not yet reached node (j).

According to another embodiment, Random Linear Network Coding is used and the quantity of information present at node (i) which has not yet reached node (j) is expressed as the difference between the rank of the matrix obtained by merging the matrices of coefficients of the two nodes (i) and (j) and the number of linearly independent coefficients at node (j).

The advantages provided by the present invention are the following:

Scalability—Nodes only need to update two quantities for each of their outgoing links: the "usefulness" and the rate at which the link is to be used. All the previously proposed solutions have limited scalability, in the sense that control variables associated to each link scale with the number of receivers in the network.

Implementation ease—The rate adaptation rule for each overlay link is the only feature which needs to be implemented. It only requires local information (i.e. local to the overlay link—control messages need to be exchanged only between neighbours). It can be enforced on top of an existing live streaming peer-to-peer implementation.

Optimality when Network Coding is used—The inventors have proved that when nodes use Random Linear Coding instead of simply storing and forwarding packets, the solution according to the present invention does not deviate from a globally optimal allocation. The inventors conjecture (and numerical evidence supports this conjecture) that starting from any rate allocation, the solution according to the present invention achieves convergence to a globally optimal allocation.

Near-optimal behaviour for classic store and forward peer-to-peer networks—Numerical simulations show that the solution according to the present invention performs well even when Network Coding is not used.

Stability—The inventors have proved that the solution according to the present invention is stable for the class of separable global cost functions, i.e. when the price of each overlay link only depends on the rate at which it is used and does not depend on the rates of any other overlay links (there are no interdependencies between distinct overlay links). The inventors conjecture that the solution according to the invention is stable for general cost functions. Numerical simulations support this claim and show stability in all the tested scenarios.

BRIEF DESCRIPTION OF THE DRAWINGS

The following detailed description will be better understood with the drawings, in which.

DETAILED DESCRIPTION

In the present invention, we consider a peer-to-peer live streaming communication network comprising a plurality of nodes (i, j, ..., N).

Each node comprises computing means and communication means for connecting to the peer-to-peer network.

Figure 1:
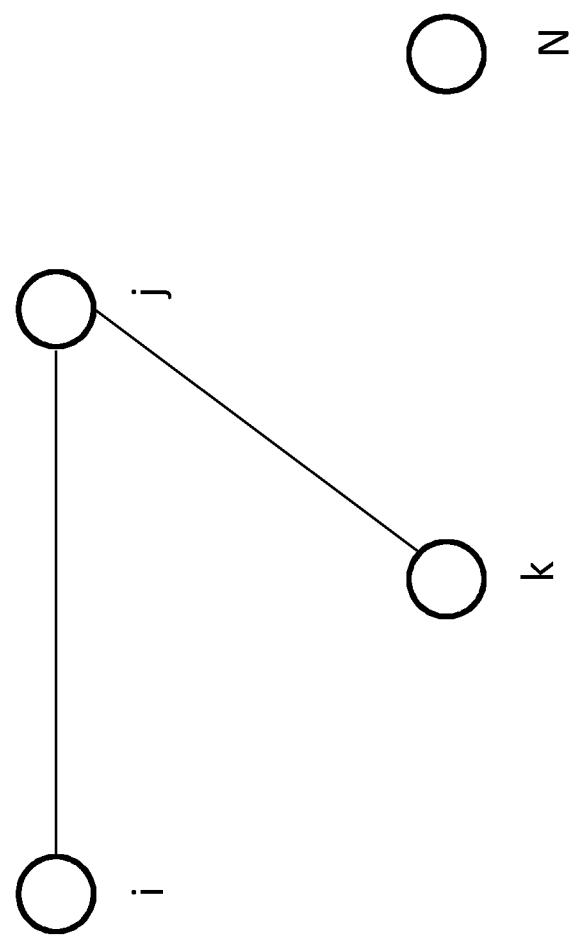
FIG. 1 shows a peer-to-peer communication network comprising a plurality of nodes.
Figure 2:
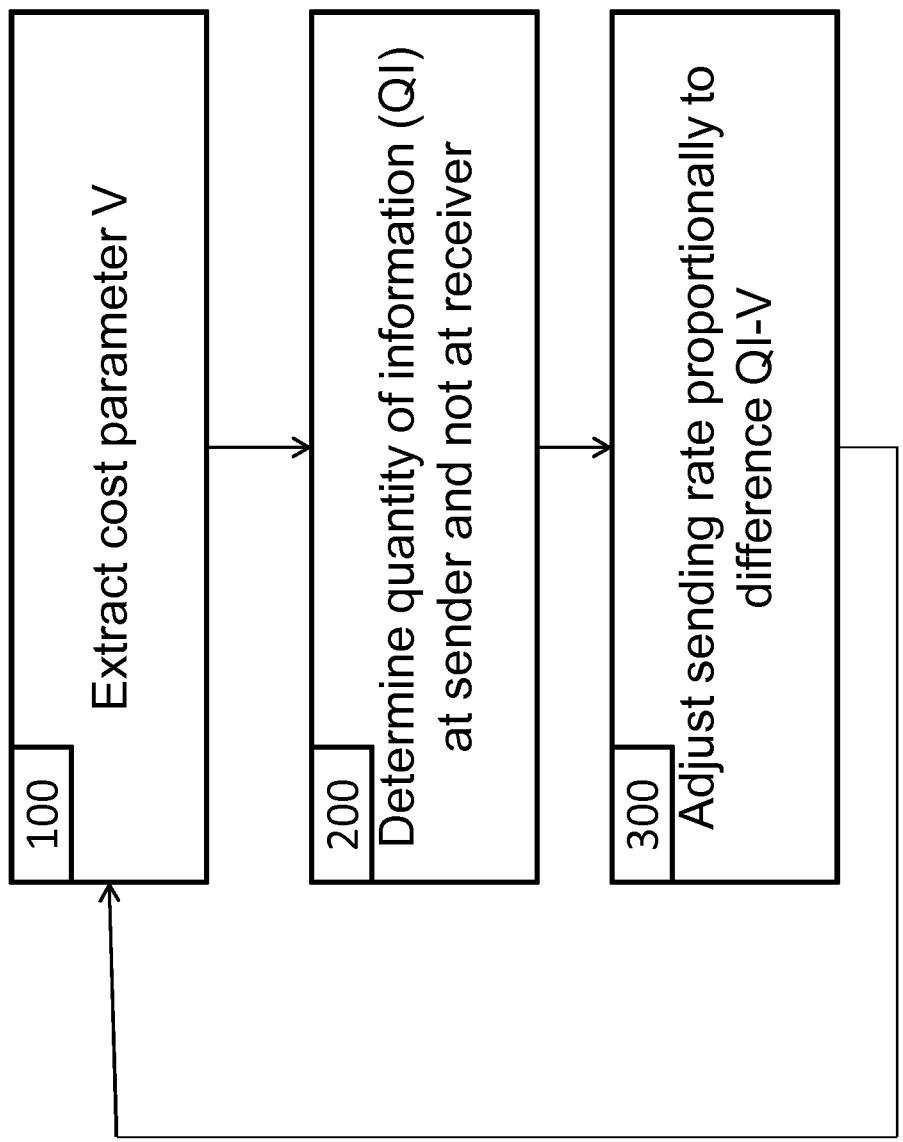
FIG. 2 is a flow-chart representing an embodiment of the method according to the present invention.

FIG. 1 shows a peer-to-peer communication network comprising a plurality of nodes FIG. 2 is a flow-chart representing an embodiment of the method according to the present invention. The method begins by extracting a cost parameter ("V") associated with transmitting over an overlay link (step 100), as discussed further below. The method then determines a usefulness or quantity of information value ("QI") of the link (step 200) based upon the number of packets at a sending node and not at a receiving node. The method then adjusts the sending rate of the link to be proportional to the difference between the quantity of information value and the cost parameter (step 300).

According to an embodiment, nodes maintain the following state variables per outgoing overlay link:

An RTT estimate

A value called "the weight"

The target rate

A variable characterizing the amount of useful information that can be transferred along the overlay link called "the usefulness" of the overlay link Tracker Upon connecting to the peer-to-peer streaming system, a node receives a list of neighbors from a host called "the tracker". The peer-to-peer system has a special node called "tracker". Upon arriving in such a system a peer contacts the tracker. The tracker then returns a list of addresses of active peers to which the newcomer can connect directly. Hence, the tracker imposes the set of neighbors of newly connected peers. In the present setting, the tracker is set up by the service provider and detains information with respect to the network location of peers.

A peer only communicates with its neighbors. In peer-to-peer streaming nodes communicate only with their neighbors. In a so-called "pull" system a node will request missing chunks of data from its neighbors and, if the neighbors have these chunks, they will send them to the requester. Thus the chunks propagate through the entire network without a centralized controller.

Determining Cost

The RTT (Round Trip Time) between two peers characterizes congestion on the overlay link connecting the two. For example, queuing theory shows that the sojourn time of a packet in an M/M/1 queue is inversely proportional to the spare capacity of the queue. In the present context, an estimate of the RTT is maintained by periodical probe packet measurements as a measure of congestion. The RTT is used to compute the dynamic cost of transmitting along that overlay link which is due to congestion.

When providing a node with the list of neighbors, the tracker also provides the ISP-term of the prices of the overlay links that connect the node to the neighbors. This price is computed for each overlay link as the sum of the weights of the physical links that the overlay link is using. The peer-to-peer network is defined by overlay links between peers. The term "overlay link" is an abstraction for the routing process. In fact, when a packet is sent from a peer A to a peer B (i.e., along the overlay link A-B), it will traverse several physical links and intermediary IP routers. In this sense, the overlay link A-B "uses" the set of physical links that are traversed by packets originating at A and addressed to B. The tracker (set up by the service provider) stores a weight for each physical link in the provider's network. These weights can be customized by the service provider and they represent a fixed price (or cost). The higher the weight of a physical link, the least desirable it is for the service provider that that specific physical link be used. When a peer A within the provider's network connects for the first time to the tracker, the latter knows for each active peer B which physical links will be used by the overlay link A-B. When it communicates to peer A the address of peer B, it also includes the sum of the weights of these physical links, thus providing peer A with the fixed price (cost) of the overlay link A-B.

The price of an overlay link will be computed as the sum of the RTT estimate and the tracker-assigned weight. That is, the total cost of overlay link A-B is defined as the sum of the congestion cost (estimated as the RTT) and the fixed cost provided by the tracker.

Determining Usefulness

In the case of classic store and forward networks, the usefulness of an overlay link is defined as the number of packets present at the origin node and absent at the destination node.

Every node wishes to receive the same data from the source. In the classic setting, a piece of content is divided into packets (or chunks) at the source node. In the beginning the source has all the chunks and the receivers have none. Nodes collect the chunks, but they can receive them only from their neighbors (the set of which may or may not include the source node). Hence, if we follow the distribution of a single chunk, the nodes which have the source as a neighbor will receive the chunk immediately and they will store it, then the chunk will propagate from these nodes to their neighbors, and so on. Two neighbors A and B simply exchange vectors of bits saying whether or not they have some specific chunk. For instance, if there are 5 chunks in total and A has only chunk#1 and chunk#3 it will send 10100 to B. If B only has chunks #2, #3 and #5, it will send 01101 to A. Then A will know that only chunk #1 is useful for B, and B will know that only chunks #2 and #5 are useful for A. Determining this value is feasible by periodically exchanging bitmaps describing the sets of packets present at the nodes. These bitmaps can be piggy-backed on the actual data packets.

In the case in which Random Linear Network Coding is used, a node holds a linearly independent set of coefficient vectors and the corresponding coded data packets. The usefulness of an overlay link can be expressed as the difference between the rank of the matrix obtained by merging the matrices of coefficients of the two nodes adjacent to the link and the number of linearly independent coefficients at the receiver node (i.e. the dimension of the vector space spanned by the coefficients at the receiver node). It can be directly computed by maintaining the aforementioned matrix of coefficients, or it can be estimated by a statistical method based on limited signaling exchanges between the two communicating nodes.

In the context of Random Linear Coding the term "coefficients" does refer to a specific notion. Namely, the source splits content into N chunks (or packets), like in the classic setting, but instead of sending individual chunks to its neighbors, it sends random linear combinations thereof. I.e. if we call the chunks $c1, \ldots, cN$, then it picks N random coefficients $a1, \ldots, aN$ and transmits these coefficients, along with the coded packet $a1*c1+ \ldots +aN*cN$. The advantage of doing this is that intermediary nodes (that have received only a few linear combinations) can generate coded packets themselves by re-coding the packets they have received. Let's say you take two linear combinations and sum them up—then you get yet another linear combination, although you still don't know the original packets. By the end, each receiver will need to get N linearly independent coded packets and then will need to solve a linear system in order to retrieve the original (uncoded) packets. The fact that the coefficients are picked at random insures linear independence with high probability.

Determining the Rate

Periodically the rate of an overlay link is adapted as follows: it increases proportionally to the usefulness and decreases proportionally to the price of the link.

We show that all the content is delivered to the receivers and that cost-optimality holds. For instance, sending data at the maximum rate possible on each overlay link would deliver the content, but would clearly not minimize communication cost!

Packet Scheduling

Packets are sent at the rate indicated by the maintained state variable. It is referred to as "the target rate" in the list of state variables maintained per overlay link If UDP is used, the rate can be enforced in two ways:

Maintaining a "window" of packets to be sent and waiting for an acknowledgement before sending the contents of the next window, Spacing packets equally to achieve desired rate by using a "leaky bucket" implementation.

If TCP is used, the solution according to the present invention is implemented at the application layer above TCP by providing packets to the TCP socket at the previously determined rate.

The above specification, examples and drawings provide a complete description of the method according to the present invention. Since many embodiments of the invention can be made without departing from the spirit and scope of the invention, the invention resides in the claims herein after appended.

The invention claimed is:

1. A method of distributing content to a first node in a peer-to-peer live streaming communication network from a group of neighboring nodes for the first node, wherein the network comprises a plurality of nodes that includes the first node and the neighboring nodes for the first node, wherein each neighboring node is configured to store a respective quantity of said content for distribution to the first node, the method comprising:

determining a usefulness value for each node in the group of neighboring nodes, wherein the usefulness value corresponding to a particular neighboring node in the group is directly proportional to the respective quantity of said content for distribution to the first node that is stored at the particular neighboring node and that has not yet been received by the first node from any neighboring node;

determining a cost value for each link defined between the first node and each neighboring node from the group of neighboring nodes, wherein the cost value for each respective link is determined based upon one or more of: an observed packet round trip time on the corresponding link, a packet loss rate on the corresponding link, an explicit congestion notification mark defined the an IETF ECN (Internet Engineering Task Force—Explicit Congestion Notification) Standard, and a constant value defined for the peer-to-peer network; and adapting, for each particular neighboring node in the group of neighboring nodes for the first node, a data rate for the link between the first node and a particular neighboring node in said group to be optimal based on a difference between the usefulness value for the particular neighboring node and the cost value for the link between the particular neighboring node and the first node, wherein the difference is realized by:

increasing the data rate for said link based on a higher usefulness value being determined for the particular neighboring node and correspondingly decreasing the data rate for said link based on a lower usefulness value being determined for the particular neighboring node; and decreasing the data rate for said link based on a higher cost value being determined for said link and increasing the data rate for said link based on a lower cost value being determined for said link.

2. The method of claim 1, further including using Random Linear Network Coding, and wherein the respective quantity of content stored in a neighboring node which has not yet been received by the first node is expressed as a difference between a rank of a matrix obtained by merging a matrix of coefficients of the first node with a matrix of coefficients of the particular neighboring node of the group and the number of linearly independent coefficients at the first node.

3. The method as defined in claim 2, wherein the content is divided into a plurality of N chunks and wherein each neighboring node receives a random linear combination of the N chunks of content, where N is an integer representing a number of said neighboring nodes for the first node.

4. The method of claim 1, further including estimating the respective quantity of content stored in a neighboring at a particular neighboring node of the group based on limited signaling exchanges between the first node and the particular neighboring node.

5. The method of claim 1, further including, at a second node of said plurality of nodes, receiving a list of active nodes in the network, and providing information about neighboring nodes to a further node that is being added to the network.

6. The method defined in claim 1, wherein the constant value defined for the peer-to-peer network represents a weight for the particular link, said weight being inversely proportional to a desirability evidenced for utilizing the link for distributing said content.

7. The method defined in claim 1, wherein said method is performed by the first node.

8. The method defined in claim 1, wherein said method is performed by a node from said plurality of nodes other than the first node.

9. The method defined in claim 1, wherein said content is divided into one of: a plurality of packets or a plurality of chunks.

10. The method defined in claim 1, wherein said determining the cost value for each link is determined based upon a combination of: the observed packet round trip time on the corresponding link, the packet loss rate on the corresponding link, the explicit congestion notification mark defined the an IETF ECN Standard, and the constant value defined for the peer-to-peer network.

11. A method of distributing content to a first node in a peer-to-peer live streaming communication network from a group of neighboring nodes for the first node, wherein the network comprises a plurality of nodes that includes the first node and the neighboring nodes for the first node, wherein each neighboring node is configured to store a respective quantity of said content for distribution to the first node, the method comprising:

determining a usefulness value for each node in the group of neighboring nodes, wherein the usefulness value corresponding to a particular neighboring node in the group is directly proportional to the respective quantity of said content for distribution to the first node that is stored at the particular neighboring node and that has not yet been received by the first node from any neighboring node;

determining a cost value for each link defined between the first node and each neighboring node from the group of neighboring nodes, wherein the cost value for each respective link is determined based upon one or more of: an observed packet round trip time on the corresponding link, a packet loss rate on the corresponding link, an explicit congestion notification mark defined the an IETF ECN (Internet Engineering Task Force—Explicit Congestion Notification) Standard, and a constant value defined for the peer-to-peer network; and adapting, for each particular neighboring node in the group of neighboring nodes for the first node, a data rate for the link between the first node and a particular neighboring node in said group to be optimal based on a difference between the usefulness value for the particular neighboring node and the cost value for the link between the particular neighboring node and the first node, wherein the difference is realized by:

increasing the data rate for said link connecting the particular neighboring node to the first node proportionally with the usefulness value determined for the particular neighboring node; and decreasing the data rate for said link connecting the particular neighboring node to the first node proportionally with the cost value determined for the link associated with the particular neighboring node.

12. The method of claim 11, further including using Random Linear Network Coding, and wherein the respective quantity of content stored in a neighboring node which has not yet been received by the first node is expressed as a difference between a rank of a matrix obtained by merging a matrix of coefficients of the first node with a matrix of coefficients of the particular neighboring node of the group and the number of linearly independent coefficients at the first node.

13. The method as defined in claim 12, wherein the content is divided into a plurality of N chunks and wherein each neighboring node receives a random linear combination of the N chunks of content, where N is an integer representing a number of said neighboring nodes for the first node.

14. The method of claim 11, further including estimating the respective quantity of content stored in a neighboring at a particular neighboring node of the group based on limited signaling exchanges between the first node and the particular neighboring node.

15. The method of claim 11, further including, at a second node of said plurality of nodes, receiving a list of active nodes in the network, and providing information about neighboring nodes to a further node that is being added to the network.

16. The method defined in claim 11, wherein the constant value defined for the peer-to-peer network represents a weight for the particular link, said weight being inversely proportional to a desirability evidenced for utilizing the link for distributing said content.

17. The method defined in claim 11, wherein said method is performed by the first node.

18. The method defined in claim 11, wherein said method is performed by a node from said plurality of nodes other than the first node.

19. The method defined in claim 11, wherein said content is divided into one of: a plurality of packets or a plurality of chunks.

20. The method defined in claim 11, wherein said determining the cost value for each link is determined based upon a combination of: the observed packet round trip time on the corresponding link, the packet loss rate on the corresponding link, the explicit congestion notification mark defined the an IETF ECN Standard, and the constant value defined for the peer-to-peer network.

21. A node in a peer-to-peer live streaming communication network for distributing content to a first node from a group of neighboring nodes for the first node, wherein the network comprises a plurality of nodes that includes the node, the first node, and the neighboring nodes for the first node, wherein said node is one of the first node and the neighboring nodes for the first node, wherein each neighboring node is configured to store a respective quantity of said content for distribution to the first node, said node comprising a memory and a processor coupled to said memory, the processor configured for:

determining a usefulness value for each node in the group of neighboring nodes, wherein the usefulness value corresponding to a particular neighboring node in the group is directly proportional to the respective quantity of said content for distribution to the first node that is stored at the particular neighboring node and that has not yet been received by the first node from any neighboring node;

determining a cost value for each link defined between the first node and each neighboring node from the group of neighboring nodes, wherein the cost value for each respective link is determined based upon one or more of: an observed packet round trip time on the corresponding link, a packet loss rate on the corresponding link, an explicit congestion notification mark defined the an IETF ECN (Internet Engineering Task Force—Explicit Congestion Notification) Standard, and a constant value defined for the peer-to-peer network; and adapting, for each particular neighboring node in the group of neighboring nodes for the first node, a data rate for the link between the first node and a particular neighboring node in said group to be optimal based on a difference between the usefulness value for the particular neighboring node and the cost value for the link between the particular neighboring node and the first node, wherein the difference is realized by:

increasing the data rate for said link connecting the particular neighboring node to the first node proportionally with the usefulness value determined for the particular neighboring node; and decreasing the data rate for said link connecting the particular neighboring node to the first node proportionally with the cost value determined for the link associated with the particular neighboring node.

* * * * *